(12) United States Patent
De Mers et al.

(10) Patent No.: US 10,754,745 B2
(45) Date of Patent: *Aug. 25, 2020

(54) SUBSCRIPTION METHODS AND SYSTEMS FOR COMPONENT INFORMATION OF A SYSTEM

(71) Applicant: HONEYWELL INTERNATIONAL INC., Morris Plains, NJ (US)

(72) Inventors: Robert E. De Mers, Nowthen, MN (US); Wendy Foslien, Woodbury, MN (US)

(73) Assignee: Honeywell International Inc., Morris Plains, NJ (US)

(*) Notice: Subject to any disclaimer, the term of this patent is extended or adjusted under 35 U.S.C. 154(b) by 102 days.

This patent is subject to a terminal disclaimer.

(21) Appl. No.: 15/977,097

(22) Filed: May 11, 2018

(65) Prior Publication Data

US 2018/0260294 A1 Sep. 13, 2018

Related U.S. Application Data

(63) Continuation of application No. 14/230,982, filed on Mar. 31, 2014, now Pat. No. 9,971,665.

(51) Int. Cl.
*G06F 11/30* (2006.01)
*G06Q 10/00* (2012.01)

(52) U.S. Cl.
CPC ...... *G06F 11/3006* (2013.01); *G06F 11/3079* (2013.01); *G06F 11/3086* (2013.01); *G06Q 10/20* (2013.01)

(58) Field of Classification Search
CPC .............................. G06F 11/0766; G06F 11/30

USPC .......................................................... 714/57
See application file for complete search history.

(56) References Cited

U.S. PATENT DOCUMENTS

| | | | |
|---|---|---|---|
| 5,579,231 A | 11/1996 | Sudou et al. | |
| 8,155,817 B2 | 4/2012 | Oesterling | |
| 8,335,575 B2 | 12/2012 | Papenfort et al. | |
| 2006/0149840 A1 | 7/2006 | Thompson et al. | |
| 2007/0255442 A1 | 11/2007 | Nakamura et al. | |
| 2009/0083204 A1 | 3/2009 | Baier et al. | |
| 2009/0089231 A1 | 4/2009 | Baier et al. | |
| 2010/0197238 A1 | 8/2010 | Pathuri et al. | |
| 2011/0009715 A1 | 1/2011 | O'Reilly et al. | |
| 2013/0124911 A1 | 5/2013 | Griffith et al. | |
| 2013/0166569 A1 | 6/2013 | Navas | |
| 2013/0171959 A1 | 7/2013 | Ahluwalia et al. | |
| 2014/0324751 A1 | 10/2014 | Roberts et al. | |
| 2015/0278071 A1 | 10/2015 | Mers et al. | |
| 2016/0191340 A1* | 6/2016 | Anakkot | H04L 67/24 709/223 |

FOREIGN PATENT DOCUMENTS

WO 2010071782 A1 6/2010

* cited by examiner

*Primary Examiner* — Chae M Ko
(74) *Attorney, Agent, or Firm* — Bookoff McAndrews, PLLC

(57) ABSTRACT

A method of tracking and reporting data associated with a component of a system is provided. The method includes: creating a subscription that is associated with a component of a system based on subscription parameters; receiving component data associated with the component of the system; and generating reporting data based on the subscription and the component data.

20 Claims, 4 Drawing Sheets

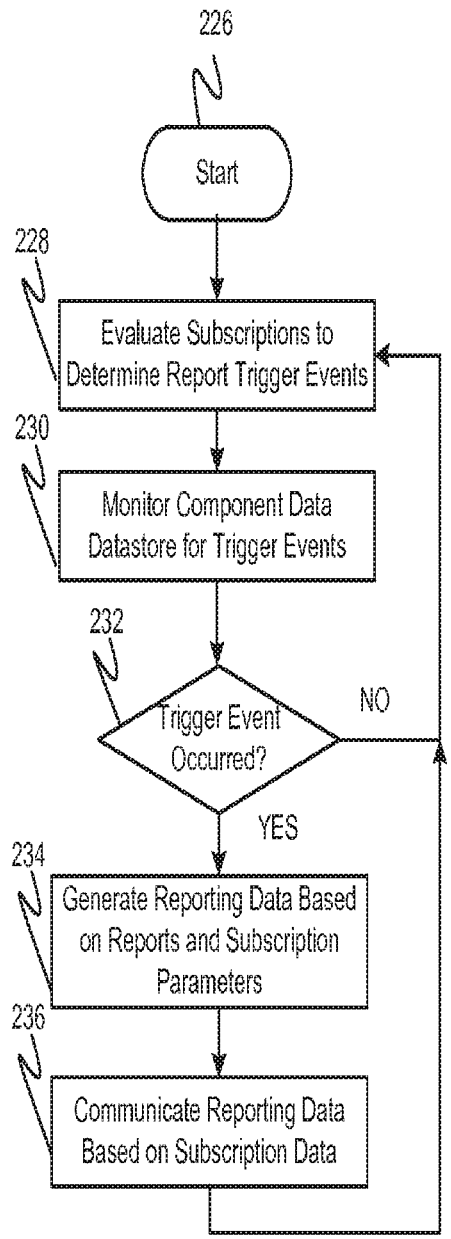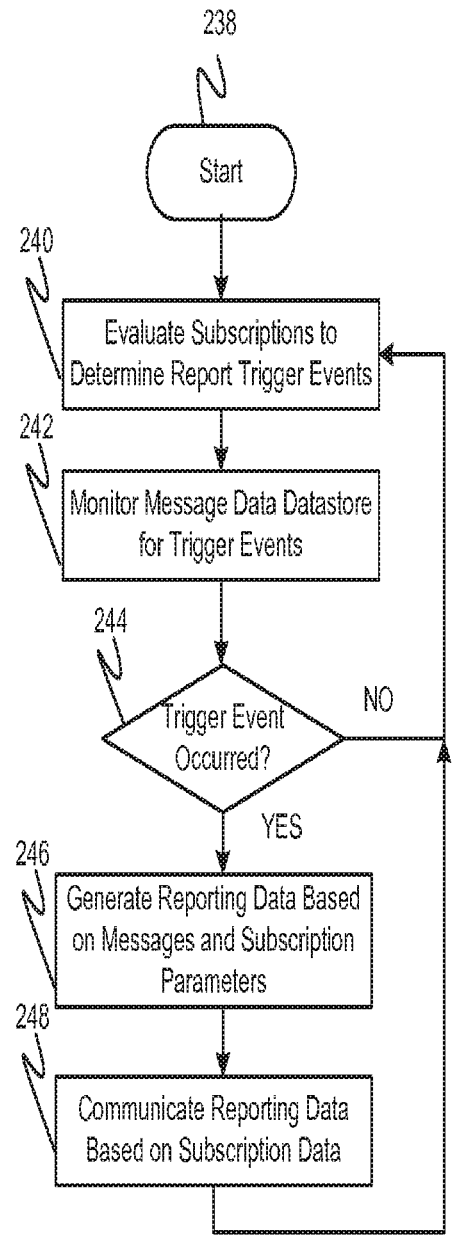
FIG. 6
FIG. 7

SUBSCRIPTION METHODS AND SYSTEMS FOR COMPONENT INFORMATION OF A SYSTEM

CROSS-REFERENCE TO RELATED APPLICATION(S)

This patent application claims the benefit under 35 U.S.C. § 119 to U.S. Nonprovisional patent application Ser. No. 14/230,982, filed on Mar. 31, 2014, the entirety of which is incorporated herein by reference.

TECHNICAL FIELD

The present disclosure generally relates to methods and systems for tracking and reporting information about a component of a system.

BACKGROUND

In multi-stage processes, such as component repair and overhaul, it can be difficult to track reports about specific components or faults. It becomes even more difficult when a number of facilities at a number of sites around the world are responsible for the repair and overhaul, such as in aircraft component repair and overhaul. An engineer may have to comb through databases of information from many different sites to learn about faults or issues with the components. In addition, the engineer may never know if the faults or issues were ever discussed.

Hence, there is a need for improved systems and methods for tracking and reporting information about components of a system. Other desirable features and characteristics will become apparent from the subsequent detailed description and the appended claims, taken in conjunction with the accompanying drawings and the foregoing technical field and background.

BRIEF SUMMARY

In one embodiment, a method of tracking and reporting data associated with a component of a system is provided. The method includes: creating a subscription that is associated with a component of a system based on subscription parameters; receiving component data associated with the component of the system; and generating reporting data based on the subscription and the component data.

In another embodiment, a system for tracking and reporting data associated with a component of a system is provided. The system includes a non-transitory computer readable medium. The non-transitory computer readable medium includes a subscription manager that creates a subscription associated with a component of a system based on subscription parameters. The non-transitory computer readable medium further includes a data manager that receives component data associated with the component of the system; and a data reporter that generates reporting data based on the subscription and the component data.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein:

FIGS. 3-7 are flowcharts illustrating methods that may be performed by the subscription system in accordance with exemplary embodiments.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
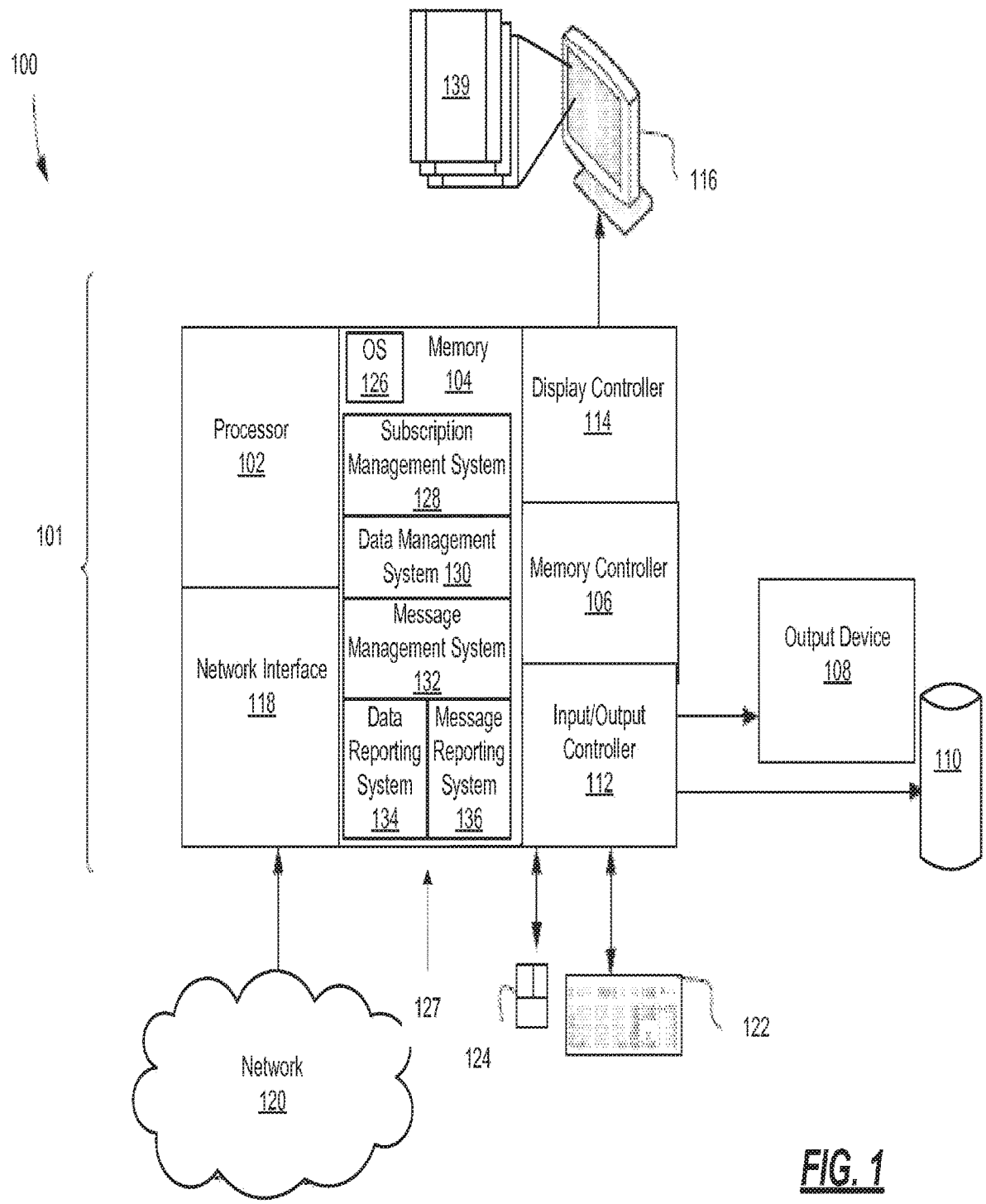
FIG. 1 is a functional block diagram illustrating a computing system that includes a subscription system in accordance with exemplary embodiments.

Referring now to FIG. 1, exemplary embodiments of the present disclosure are directed to a computing system shown generally at 100. As can be appreciated, the computing system 100 described herein can be implemented for any system having multiple components. For example, the computing system 100 can be associated with an aircraft system (or other vehicle system) for allowing users to subscribe to information about aircraft parts (or other vehicle parts). In another example, the computing system can be associated with a facility (e.g., having a single building or multiple buildings) for allowing users to subscribe to information about facility components (e.g., HVAC systems, lighting systems, security systems). In still another example, the computing system can be associated with a manufacturing facility for allowing users to subscribe to information about machines or other components of the manufacturing process. For exemplary purposes, the disclosure will be discussed in the context of a computing system 100 being associated with an aircraft system.

Turning now to FIG. 1 in greater detail, the exemplary computing system 100 is shown to include a computer 101. As can be appreciated, the computer 101 can be any computing device, including but not limited to, a desktop computer, a laptop, a server, a portable handheld device, or any other electronic device, or a number of networked devices. For exemplary purposes, the disclosure will be discussed in the context of the computer being a single server.

The computer 101 is shown to include one or more processors 102, memory 104 coupled to a memory controller 106, one or more input and/or output (I/O) devices 108, 110 (or peripherals) that are communicatively coupled via a local input/output controller 112, and a display controller 114 coupled to a display 116. In an exemplary embodiment, a conventional keyboard 122, and a mouse 124, and any other input devices can be coupled to the input/output controller 112. In an exemplary embodiment, the computing system 100 can further include one or more network interfaces 118 for coupling to one or more networks 120. The one or more networks 120 transmit and receive data between the computer 101 and other computing systems using one or more wired or wireless communication protocols.

In various embodiments, the memory 104 stores instructions that can be performed by the processor 102. The instructions stored in memory 104 may include one or more separate programs, each of which comprises an ordered listing of executable instructions for implementing logical functions. When the computer 101 is in operation, the processor 102 is configured to execute the instructions stored within the memory 104, to communicate data to and from the memory 104, and to generally control operations of the computer 101 pursuant to the instructions. The processor 102 can be any custom made or commercially available processor, a central processing unit (CPU), an auxiliary processor among several processors associated with the computer 101, a semiconductor based microprocessor (in the form of a microchip or chip set), a microprocessor, or generally any device for executing instructions.

In the example of FIG. 1, the instructions stored in the memory 104 include an operating system (OS) 126, and a subscription system shown generally at 127. The subscription system 127 includes a subscription management system 128, a data management system 130, a message management system 132, a data reporting system 134, and a message reporting system 136. As can be appreciated, in various other embodiments, all or parts of the subscription management system 128, the data management system 130, the message management system 132, the data reporting system 134, and the message reporting system 136 can be implemented on a separate storage medium (not shown) or other computing system (not shown), such as another server or other computing device, and can communicate with the computer 101. For exemplary purposes, the disclosure will be discussed in the context of the systems all being implemented entirely on the computer 101.

In general, the operating system 126 essentially controls the performance of computer programs and provides scheduling, input-output control, file and data management, memory management, and communication control and related services. The subscription management system 128 creates and stores subscriptions to component information for various users, entities, or systems. The data management system 130 creates and stores data about components of the particular system. The message management system 132 creates and stores messages communicated between users or entities associated with the particular system. The data reporting system 134 monitors the component data and communicates reports of the data (e.g., through the network interface 118) based on the subscriptions. The message reporting system 136 monitors the message data and communicates reports of the messages (e.g., through the network interface 118) based on the subscriptions. Each of the systems 128-136 may manage a user interface 139 for display by the display 116 or display of a remote system (not shown).

Figure 2:
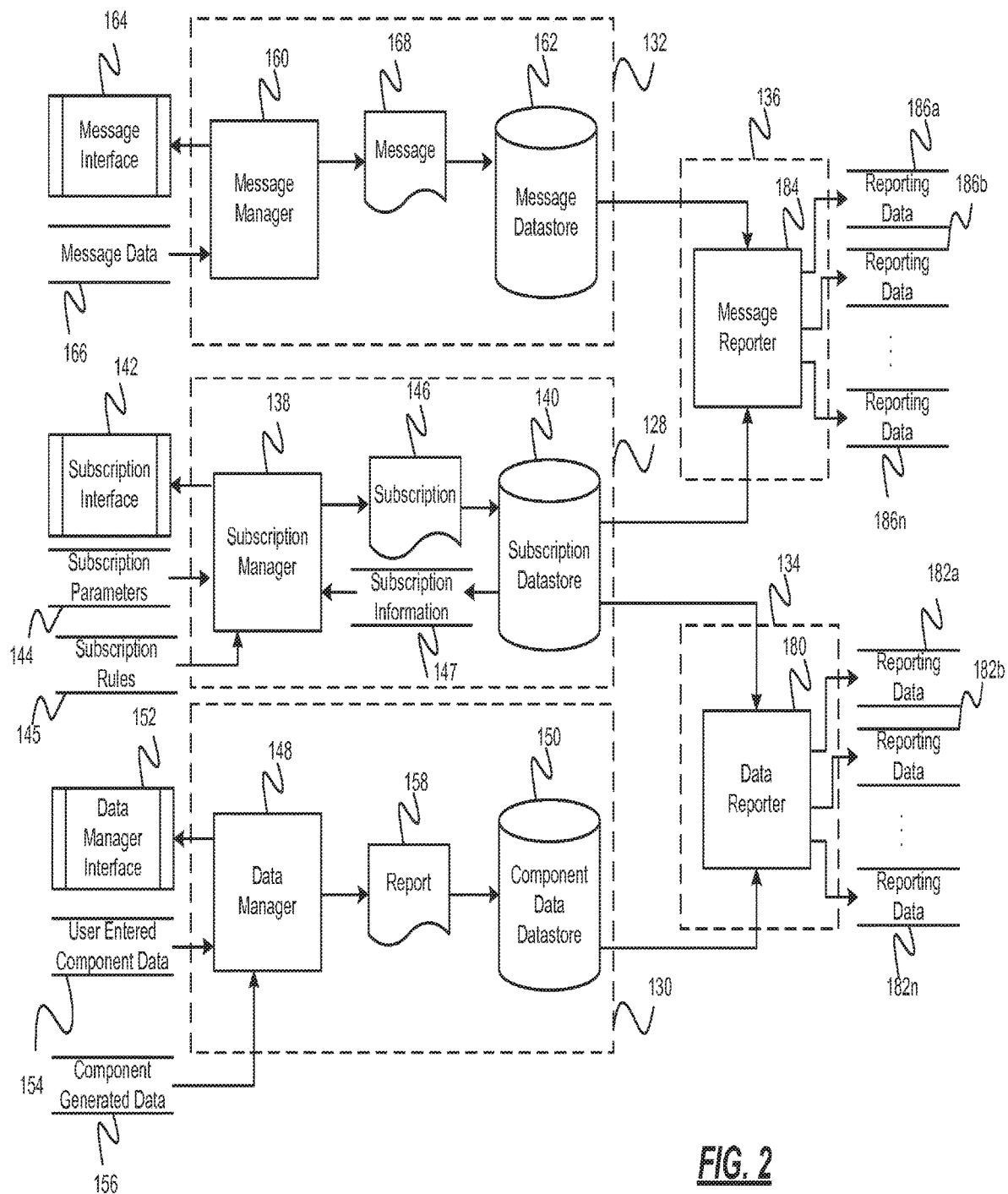
FIG. 2 is a dataflow diagram illustrating the subscription system in accordance with exemplary embodiments.

Referring now to FIG. 2, and with continued reference to FIG. 1, a dataflow diagram illustrates various embodiments of the subscription system 127. Various embodiments of subscription systems 127 according to the present disclosure may include any number of data components embedded on a non-transitory computer readable medium. As can be appreciated, the components shown in FIG. 2 may be combined and/or further partitioned to similarly create subscriptions and communicate reports based on the subscriptions. Inputs to the subscription system 127 may be received from other components (not shown), determined/modeled by Other sub-components (not shown), and/or may be user input that is based on a user interacting with one or more user interfaces 139 through one or more of the input devices 122-124.

In various embodiments, the subscription management system 128 includes a subscription manager 138 that communicates with a subscription datastore 140. The subscription manager 138 manages a subscription interface 142 that may be used by a user to define a subscription 146 and/or to look up information 147 about other subscriptions. In various embodiments, the subscription interface 142 includes one or more configuration objects such as, but not limited to, menus, lists, text entry boxes, radio buttons, links, and/or other selection items that may be manipulated by a user to configure subscription parameters 144 and/or to define subscription rules 145. The subscription manager 138 receives the subscription parameters 144 and/or the subscription rules 145 based on a user interacting with the subscription interface 142.

In various embodiments, the subscription parameters 144 indicate components to subscribe to, types of information for each component to subscribe to, how to receive reports of the information for each component to subscribe to (e.g., email, text message, data file, etc.), and/or who (e.g., a single person, or a group) and/or where to send the information to (e.g., an email address, or a phone number, a storage location, etc.). For example, the user can configure the subscription parameters to indicate a particular component of an aircraft system such as an engine component and to indicate particular information about the component to subscribe to, such as fault information, scheduled maintenance information, or repair information. In another example, the user can look up components or faults similar to a selected component or fault and can configure the subscription parameters to indicate similar components and/or similar faults to subscribe to. In another example, the user can look up information on others subscribing to a component or fault and can configure the subscription parameters 144 to indicate similar components and/or faults as the other subscribers. In yet another example, the user can further configure the subscription parameters 144 such that information about high criticality engine components are communicated by text message to the user, such that information about medium criticality engine components is communicated by email message to the user, and information about low criticality engine components is sent to a data file (e.g., to be viewed by the user).

In various embodiments, the user can use the subscription parameters 144 to configure subscription rules 145. For example, the user can configure if subscription rules such as, if a particular engine component failure occurs, then subscribe the user to all reports on all components associated with the particular engine component. As can be appreciated, other subscription parameters 144 and other subscription rules 145 are contemplated to be within the scope of the invention and thus the subscription parameters 144 and the subscription rules 145 are not limited to the provided examples. The subscription manager 138 stores the subscription parameters 144 and/or the subscription rules 145 as the subscription 146 for a user in the subscription datastore 140 for future use.

The data management system 130 includes a data manager 148 that communicates with a component data datastore 150 to store data reports 158 about various components of the system. The data in the data reports may be generated based on, for example, a smart device completing a built-in-test, based on a technician dispensing a part during teardown, based on a stage of a process flow (e.g., shipped, teardown, analysis, rebuild, in transit, install, etc.), based on hours in use, based on time of year, based on calendar events, based on a personnel capacity in a servicing center associated with the component, and/or based on any other data generating event associated with a component.

The data manager 148 manages a data manager interface 152 that may be used by a user to enter information about a component of the system. In various embodiments, the data manager interface 152 includes one or more configuration objects such as, but not limited to, menus, lists, text entry boxes, radio buttons, links, and/or other selection items that may be manipulated by a user to enter component data 154. The data manager 148 receives the user entered component data 154 based on a user interacting with the data manager interface 152.

In various embodiments, the user entered component data 154 includes information about the component including a component identifier, a status of the component (e.g., good, poor, fair, etc.), and/or descriptions of issues or any other information about the component. For example, the component data 154 for an engine component of an aircraft system may include a part number, an assembly number, a part name, a status of the part, a description of faults of the part, and/or any other information about the component such as static parameters about the component, such as engine size; serial number, manufacture date, etc. The data manager 148 stores the user entered component data 154 as a data report 158 for the component in the component data datastore 150 for future use.

In addition to or alternative to receiving the user entered component data 154, the data manager 148 receives component generated component data 156 from a component. The component generated component data 156 can be retrieved from the component (e.g., via a bar code, or other identifier) and/or can be received from the component either through a wired or wireless communication. The component generated data 156 may be a collection of data from a single component or multiple components having a data processing and communication device (i.e., a smart component). The component generated data 156 similarly includes information about the component including a component identifier, a status of the component (e.g., good, poor, fair, etc.), descriptions of issues with the component, and/or notifications for scheduled maintenance of the component. The component generated data 156 may include static parameters about the component, such as engine size, serial number, manufacture date, etc. The data manager 148 stores the component generated component data 156 as a data report 158 for the component in the component data datastore 150 for future use.

The message management system 132 includes a message manager 160 that communicates with a message data datastore 162. The message manager 160 manages a message manager interface 164 that may be used by a user to communicate information to one or more other users about the component and/or system (i.e., an email interface, or a social media type interface, etc.). In various embodiments, the message manager interface 164 includes one or more configuration objects such as, but not limited to, menus, lists, text entry boxes, radio buttons, links, and/or other selection items that may be manipulated by a user to enter message data 166. The message manager 160 receives the message data 166 based on a user interacting with the message manager interface 164. The message data 166 may include information associated with a message such as, sender data, recipient data, subject data, and content data.

The message manager 160 stores the message data 166 as a message 168 in the message data datastore 162 for future use.

The data reporting system 134 includes a data reporter 180 that communicates with the subscription datastore 140 and the component data datastore 150. The data reporter 180 generates reporting data 182a-182n based on the reports 158 in the component data datastore 150 and based on one or more of the subscription parameters 144 and/or subscription rules 145 in the subscriptions 146 of the subscription datastore 140. For example, the data reporter 180 determines a trigger event (i.e., an event defined by the received data that is of interest to a subscriber) based on the subscription parameters 144 and/or the subscription rules 145.

The data reporter 180 then evaluates the report 158 as it is saved or after it is saved to the subscription datastore 140 and generates reporting data 182a-182n when it is determined that a trigger event has occurred (i.e., one or more users have subscribed to the contents of that report 158 based on the occurrence of the event). In another example, the data reporter 180 evaluates a number of reports 158 after they are saved to the subscription datastore 140 and generates reporting data 182a-182n when it is determined that one or more trigger events has occurred (i.e., one or more users have subscribed to the contents of the reports 158 or to a summary of the contents of the reports 158). The data reporter 180 then communicates the reporting data 182a-182n based on the subscription parameters 144 and/or the subscription rules 145 in the subscriptions 146 of the subscription datastore 140.

The message reporting system 136 includes a message reporter 184 that communicates with the subscription datastore 140 and the message data datastore 162. The message reporter 184 generates reporting data 186a-186n based on the message 168 in the message data datastore 162 and based on one or more of the subscription parameters 144 in the subscriptions 146 of the subscription datastore 140. For example, the message reporter 184 determines a trigger event (i.e., an event defined by the message data that is of interest to a subscriber) based on the subscription parameters 144 and/or the subscription rules 145.

The message reporter 184 then evaluates the message 168 as it is saved or after it is saved to the subscription datastore 140 and generates reporting data 186a-186n when it is determined that one or more trigger events has occurred (i.e., one or more users have subscribed to the contents of that message 168). In another example, the message reporter 184 evaluates a number of messages 168 after they are saved to the subscription datastore 140 and generates reporting data 186a-186n when it is determined that one or more trigger events has occurred (i.e., one or more users have subscribed to the contents of the message 168 or to a summary of the contents of the messages 168). The message reporter 184 then communicates the reporting data 186a-186n based on the subscription parameters 144 in the subscriptions 146 of the subscription datastore 140.

Referring now to FIGS. 3-7, and with continued reference to FIGS. 1-2, flowcharts illustrate methods that can be performed by the subscription system 127 in accordance with various embodiments. As can be appreciated in light of the disclosure, the order of operation within the methods is not limited to the sequential execution as illustrated in FIGS. 3-7, but may be performed in one or more varying orders as applicable and in accordance with the present disclosure.

Figure 3:
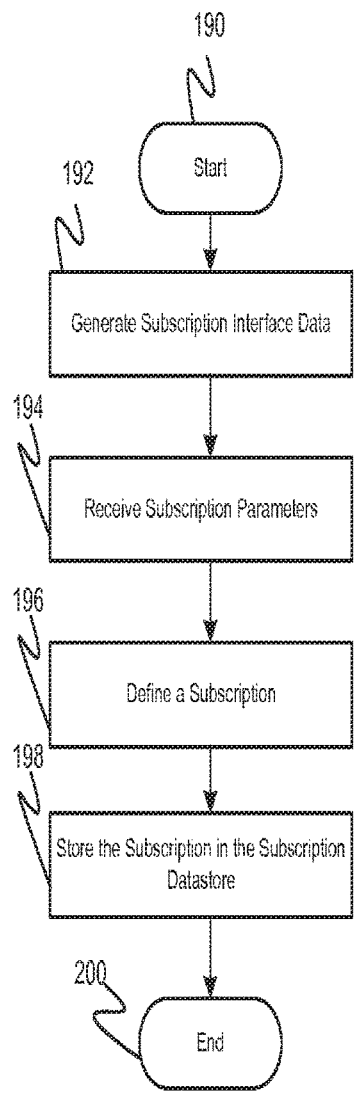

In various embodiments, the methods can be scheduled to run based on predetermined events, and/or can run continually during operation of the computing system 100. With particular reference to FIG. 3, a subscription setup method that may be performed by the subscription management system 128 is shown. In one example, the method may begin at 190. The subscription interface data for displaying the subscription interface 142 is generated at 192. The subscription parameters 144 are received at 194 based on a user interacting with the subscription interface 142. The subscription 146 is defined based on the subscription parameters 144 at 196. The subscription 146 is stored in the subscription datastore 140 at 198. Thereafter, the method may end at 200. As can be appreciated, this method may be performed any time a user elects to set up or modify a subscription.

Figure 4:
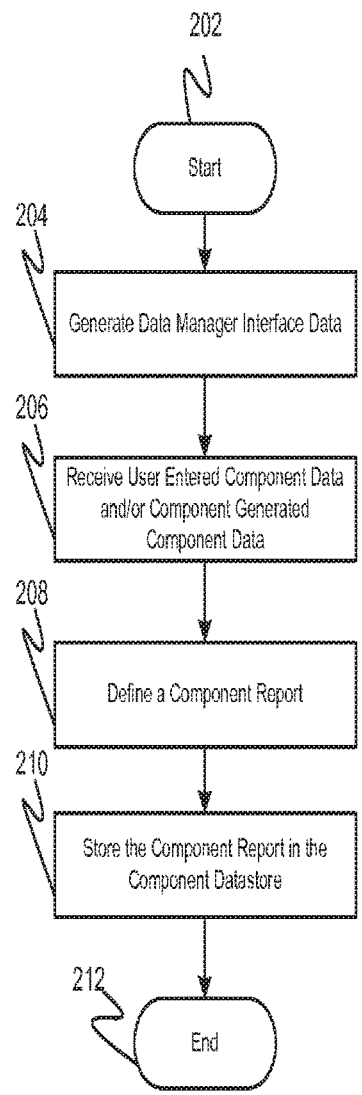

With particular reference to FIG. 4, a data management method that may be performed by the data management system 130 is shown. In one example, the method may begin at 202. The data management interface data for displaying the data manager interface 152 is generated at 204. The user entered component data 154 and/or the component generated component data 156 is received at 206 based on a user interacting with the data manager interface 152 and/or based on a transmission of the component generated component data 156. The data report 158 is defined based on the component data 154, 156 at 208. The report 158 is stored in the component data datastore 150 at 210. Thereafter, the method may end at 212. As can be appreciated, this method may be performed any time a user elects to set enter component data 151 and/or any time component generated component data 156 is received.

Figure 5:
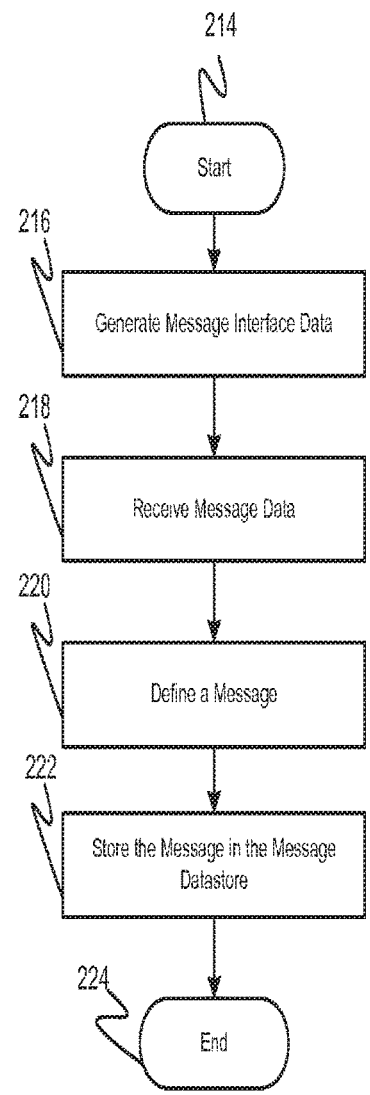

With particular reference to FIG. 5, a message management method that may be performed by the message management system 132 is shown. In one example, the method may begin at 214. The message management interface data for displaying the message manager interface 164 is generated at 216. The message data 166 is received at 218 based on a user interacting with the message manager interface 164. The message 168 is defined based on the message data 166 at 220. The message 168 is stored in the message data datastore 162 at 222. Thereafter, the method may end at 224.

With particular reference to FIG. 6, a data reporting method that may be performed by the data reporting system 134 is shown. In one example, the method may begin at 226. The subscriptions 146 in the subscription datastore 140 are evaluated at 228 to determine trigger events for generating reporting data 182a-182n. The data reports 158 stored in the component data datastore 150 are monitored at 230 based on the triggered events. If a data report 158 does not include a trigger event, then the method continues with evaluating the subscriptions 146 at 228. If, however, one or more data reports 158 includes a trigger event at 232, the reporting data 182a-182n is generated based on the report 158 and/or other report information and further based on the subscription parameters 144 (e.g., what information of the report the user wishes to be reported). The reporting data 182a-182n is then communicated to the user or users based on the subscription parameters 144 at 236 (e.g., based on what means of communication was desired by the user for the particular type of report). Thereafter, the method may return to evaluating the subscriptions 146 at 228.

With particular reference to FIG. 7, a message reporting method that may be performed by the message reporting system 136 is shown. In one example, the method may begin at 238. The subscriptions 146 in the subscription datastore 140 are evaluated at 240 to determine trigger events for generating reporting data 186a-186n. The messages 168 stored in the message datastore 162 are monitored at 242 based on the trigger events. If a message 168 does not include a trigger event at 244, then the method continues with evaluating the subscriptions 146 at 240. If, however, one or more messages 168 includes a trigger event at 244, the reporting data 186a-186n is generated based on the message 168 and/or other messages 168 and further based on the subscription parameters 144 (e.g., what information of the message 168 the user wishes to be reported). The reporting data 186a-186n is then communicated to the user based on the subscription parameters 144 at 248 (e.g., based on what means of communication was desired by the user for the particular type of report). Thereafter, the method may return to evaluating the subscriptions 146 at 240.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software; and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A computer-implemented method of tracking and reporting data associated with a component of a system, comprising:
   receiving, from a user via a subscription interface, one or more subscription parameters for defining a subscription;
   receiving component data associated with the component of the system, the component data comprising user-entered component data and component-generated component data;
   receiving message data associated with a message communicated between users of the system, the message data comprising content of the message;
   identifying a trigger event associated with at least one of the received component data or the received message data based on the one or more subscription parameters, wherein the trigger event associated with the received message data is identified at least in part by evaluating the content of the message; and
   generating, in response to identifying the trigger event, reporting data based on the subscription parameters and the at least one of the received component data or the received message data.

2. The computer-implemented method of claim 1, wherein the subscription parameters indicate at least one of: types of information associated with the component to subscribe to, a communication medium for receiving the reporting data, who to send the reporting data to, and where to send the reporting data to.

3. The computer-implemented method of claim 1, further comprising receiving, from the user via the subscription interface, one or more subscription rules for further defining the subscription.

4. The computer-implemented method of claim 1, wherein the one or more subscription parameters define the trigger event.

5. The computer-implemented method of claim 1, wherein the received component data is stored in a component data store.

6. The computer-implemented method of claim 5, wherein the trigger event is identified when a specified number of users have subscribed to content of the reporting data associated with the received component data.

7. The computer-implemented method of claim 1, wherein the received message data is stored in a message data store.

8. The computer-implemented method of claim 7, wherein the trigger event is identified when a specified number of users have subscribed to content of the reporting data associated with the received message data.

9. The computer-implemented method of claim 1, further comprising communicating the reporting data based on a subscription parameter indicating where to send the reporting data to.

10. The computer-implemented method of claim 1, wherein the receiving the component data is based on at least one of a smart device completing a built-in-test, a technician dispensing a part during teardown, a stage of a process flow, hours of the component in use, a time of year, a calendar event, and a personnel capacity in a servicing center associated with the component.

11. A system for tracking and reporting data associated with a component of a system, comprising:
    one or more processors; and
    a non-transitory computer readable medium storing instructions that, when executed by the one or more processors, cause the one or more processors to perform a method comprising:
       receiving, from a user via a subscription interface, one or more subscription parameters for defining a subscription;
       receiving component data associated with the component of the system, the component data comprising user-entered component data and component-generated component data;
       receiving message data associated with a message communicated between users of the system, the message data comprising content of the message;
       identifying a trigger event associated with at least one of the received component data or the received message data based on the one or more subscription parameters, wherein the trigger event associated with the received message data is identified at least in part by evaluating the content of the message; and
       generating, in response to identifying the trigger event, reporting data based on the subscription parameters and the at least one of the received component data or the received message data.

12. The system of claim 11, wherein the subscription parameters indicate at least one of: types of information associated with the component to subscribe to, a communication medium for receiving the reporting data, who to send the reporting data to, and where to send the reporting data to.

13. The system of claim 11, wherein the one or more subscription parameters define the trigger event.

14. The system of claim 11, wherein the received message data is stored in a message data store.

15. The system of claim 14, wherein the trigger event is identified when a specified number of users have subscribed to content of the reporting data associated with the received message data.

16. A non-transitory computer readable medium storing instructions that, when executed by one or more processors, cause the one or more processors to perform a method of tracking and reporting data associated with a component of a system comprising:

receiving, from a user via a subscription interface, one or more subscription parameters for defining a subscription;

receiving component data associated with the component of the system, the component data comprising user-entered component data and component-generated component data;

receiving message data associated with a message communicated between users of the system, the message data comprising content of the message;

identifying a trigger event associated with at least one of the received component data or the received message data based on the one or more subscription parameters, wherein the trigger event associated with the received message data is identified at least in part by evaluating the content of the message; and generating, in response to identifying the trigger event, reporting data based on the subscription parameters and the at least one of the received component data or the received message data.

17. The non-transitory computer readable medium of claim 16, wherein the subscription parameters indicate at least one of: types of information associated with the component to subscribe to, a communication medium for receiving the reporting data, who to send the reporting data to, and where to send the reporting data to.

18. The non-transitory computer readable medium of claim 16, wherein the one or more subscription parameters define the trigger event.

19. The non-transitory computer readable medium of claim 16, wherein the received message data is stored in a message data store.

20. The non-transitory computer readable medium of claim 19, wherein the trigger event is identified when a specified number of users have subscribed to content of the reporting data associated with the received message data.

* * * * *